INVENTOR
Lance A. Liotta
BY Fay, Sharpe & Mulholland
ATTORNEYS

United States Patent Office 3,723,064
Patented Mar. 27, 1973

3,723,064
METHOD AND DEVICE FOR DETERMINING THE CONCENTRATION OF A MATERIAL IN A LIQUID
Lance A. Liotta, 14004 Mont Ave.,
East Cleveland, Ohio 44112
Filed July 26, 1971, Ser. No. 165,471
Int. Cl. G01n 31/06, 31/22
U.S. Cl. 23—230 R                14 Claims

ABSTRACT OF THE DISCLOSURE

A layered testing device is used for quantitatively determining the concentration of a substance. The layered device includes a first porous layer impregnated with a reagent system adapted to react with the test substance to produce an end product. Adjacent to the first porous layer is a membrane having plural regions each having a different permeability to said end product. The difference in permeability is obtained either by impregnating the regions with different concentrations of a chemical reactive with the end product or by varying the pore size in the regions. Adjacent the membrane there may be a porous element to aid in drawing the end product under test out of the membrane. Immediately adjacent to the porous element is an indicator layer containing an indicator substance for providing a visual indication of any of said end product reaching the indicator layer. By marking the indicator layer in accordance with the region's permeabilities, a visual indicator of and method of determining concentration is available.

This invention relates to a detecting device and, more particularly, to a testing device for quantitatively determining the concentration of a test fluid using a visual indicator.

BACKGROUND OF THE INVENTION

There are many instruments available today for the analysis of body fluids including urine, blood and the like. Among these instruments are included the gas chromatograph and automatic blood analysis equipment both of which are capable of taking a sample of one of the body fluids and analyzing it for various components or subcomponents. While generally satisfactory, these instruments are relatively expensive and often difficult and time consuming to operate. They do, however, provide highly accurate results which give both quantitative as well as qualitative information.

Among the simpler diagnostic techniques are included the test strips impregnated with various chemicals which when reacted with a body fluid or other substance under test yield a characteristic color change which provides information both as to the presence and concentration of the particular chemical substance under test. These colormetric tests, while available, have several disadvantages. For one, color changes often must be compared against a standard color which, if done by the eye, yield inaccuracies.

Another disadvantage is that the color changed produced is relatively transient in nature and often uneven. Hence, it becomes a question of judgement on the part of the analyst to determine which portion of the test strip to examine. To provide accurate information as to concentration, the color change must be measured by the use of a colorimeter or other instrument capable of providing precise color comparison results. Furthermore, since the sense strip does not provide a permanent display, it does not provide a lasting record of the test.

It is, therefore, an object of this invention to obviate many of the disadvantages of the prior art techniques for the testing of the presence of substances.

Another object of this invention is to provide an improved method testing for the presence and concentration of biochemical substances.

Still another object of this invention is to provide an improved test device which is relatively simple to operate and yet provides a permanent record for indicating the presence and concentration of substances under test.

BRIEF DESCRIPTION OF THE INVENTION

In accordance with the preferred method of this invention a fluid containing the substance under test is permitted to permeate through a membrane having different regions therein which have different permeabilities to the fluid under test. An indicator strip or layer sensitive to the substance under test is placed adjacent the several regions of the membrane to provide a visual indication of those regions which permit after a period of time the passage of the fluid under test.

Modifications of the method include initially reacting of the fluid under test with a chemical reagent to produce an end product prior to passage through the membrane. The end product may be reacted with a chemical sensitive to the end product during passage through the membrane. Different concentrations of this reactive chemical are placed in each of the membrane's regions to vary the permeation of the end product through the different regions according to concentration of the original test substance. Alternatively, pore size variation between the several membrane regions may be relied on to achieve the selective region permeabilities.

A preferred embodiment of the invention includes a layered test device in which the first or receiving layer is highly porous and impregnated with a chemical reagent for reaction with the fluid substance under test to produce an end product. Adjacent the receiving layer is a porous membrane layer having regions of different permeability to the test fluid. A second or transmission layer is placed on the other side of the membrane layer to aid in drawing the end products through the membrane layer and passing them on to the next layer. This next layer, an indicator layer, is impregnated with a chemical reactive with the end product to provide a visual or color indication of the presence of the end product reaching the indicator layer. In this manner, any end product which permeates through the membrane will produce a visual indication on the indicator layer. The indicator layer is adapted to be peeled off to provide a permanent record of color changes produced thereon. These color changes indicate not only presence of the chemical of the fluid under test but also its concentration.

Using this preferred test device, the fluid under test is applied to the receiving layer where it is exposed to and reacts with the reagent contained therein. The end product of that reaction passes through the membrane layer which permits passage of the end product through the various regions of the membrane according to the concentration of the substance in the fluid under test, i.e., the end product permeats through the specific reagents of the membrane layer only if it exceeds a certain concentration. The indicator impregnated display strip, which is effectively in contact with the other side of the membrane layer through the transmission receives and registers by a color change the presence of the end product. Since the permeation through the permeable membrane layer occurs at specific regions according to concentration, the display on the indicator strip of those regions by the color indication displays also the concentration of the test substance present in the test fluid.

BRIEF DESCRIPTION OF THE DRAWINGS

The novel features that are considered characteristic of this invention are set forth with particularity in the appended claims. The invention, itself, however, both as to its organization and method of operation, as well as additional objects and advantages thereof, will best be understood from the following description when read in connection with the accompanying drawings, in which:

DESCRIPTION OF THE PREFERRED EMBODIMENT

Figure 1:
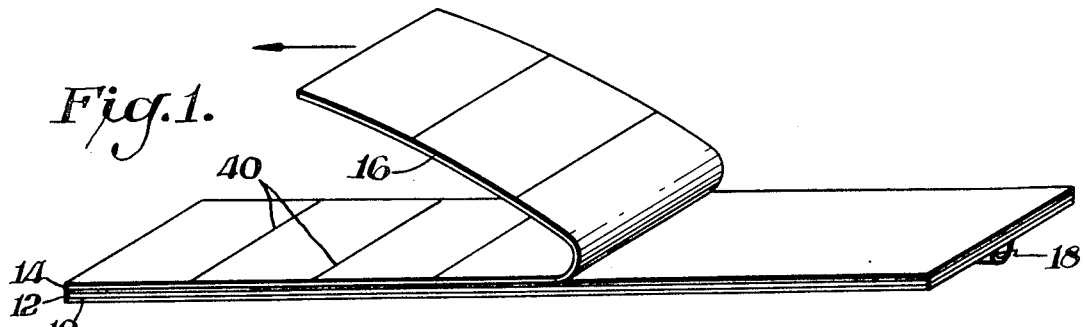
FIG. 1 is a pictorial view of the layered test device of this invention with the display strip peeled back.
Figure 2:
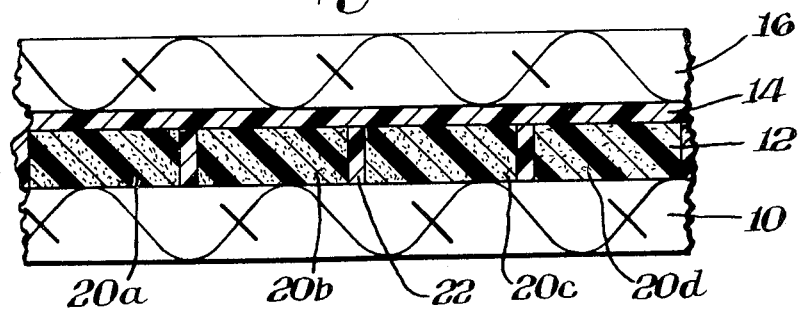
FIG. 2 is a fragmental cross-sectional representation greatly enlarged, of a section of the test device illustrated in FIG. 1.

In describing the novel method and device of this invention reference will first be had to the drawings in which the test device itself is seen most clearly in FIGS. 1 and 2. The test device comprises a series of layers placed together in a laminated or sandwich fashion. Each layer is either formed differently from its adjoining layers or is impregnated with a chemical to perform particular functions in the test device. Thus, as seen in FIG. 1, the test device of this invention includes a receiving or porous reactant layer 10, a differential membrane layer 12, a porous transmission layer 14, and a display strip 16. The reactant layer 10 has secured thereto, so as to be in intimate contact therewith, a capillary sized tube which is in effect cut in half to form a U-shaped conduit or channel 18 one side of which is formed by the reactant layer 10. Channel 18 acts as a container for the test fluid and it runs the full length of the device. The fluid under test may, for example, be any chemical whose presence or concentration is desired to be tested for and indicated such as blood, urine, etc. various components of any of these mixtures are tested for in various medical laboratories routinely and, for that matter, during the course of operations. The volumes are adjustable simply by changing the size of the tube and, if necessary, the size of the layer. Channel 18 is adhered to the reactant layer 10 by gluing or other suitable means. A suitable adherent for this purpose is any water-proof glue (rubber cement). The tubing used may be inert plastic such as polyethylene, glass, or other suitable material and may be formed, if desired, by extrusion or molding.

The receiving layer 10 may be formed of a relatively porous paper or any other suitable porous material. In the preferred embodiment the porous material is presoaked with a chemical reagent capable of reacting with a component in the fluid under test and particularly the test substance contained therein to produce a desired reactant or end product. In this manner, it becomes a reactant layer 10 and, with or without the capillary tube, it acts as a receiver for the material under test. This reactant layer 10 which receives the test fluid performs several functions. Because of its uniform porosity, capillary migration provides an even distribution of the components in test fluid before entering the adjacent membrane layer 12. It also functions to supply the test fluid or its reaction products to the membrane layer 12 at a uniform rate. Finally, it serves to protect the membrane layer and may be fixed to the membrane layer as by laminating. Suitable adherents are any permeable materials such as starch or resins. The receiving layer 10 need not be impregnated with a reagent for reaction with the test fluid. The test fluid itself may be such as will provide a visual indication when reacted with the display strip as will be described. In any case, either the fluid under test or the end products thereof (after reaction with the reagent in the reactant layer 10) passes through the reactant layer 10 to the next layer, the differential membrane layer 12.

This next layer 12 is a differential porous membrane composed of a plurality of regions 20a, 20b, 20c and 20d (FIG. 2) which vary in their permeability to the test fluid, or its reaction products formed in the layer 10, sequentially and in a graduated manner along the length of the membrane layer 12. In a preferred embodiment, the membrane layer 12 is a cellulose substrate of relatively high porosity such as filter paper. The cellulose substrate is saturated at discrete regions 22 with a permeable composition of an organic polymer such as cellulose acetate to form barriers 22 which separate the regions 20a–20d inclusive. These barriers 22 thus form the dividing line between the several regions 20a, 20b, 20c and 20d.

The barriers 22 perform several functions. For one, they permit a predetermined degree of cross migration between the compartments of the test fluid or reaction products. This cross-migration serves to provide a smoother gradient of concentration of this test fluid between compartments. Thus, with a sufficient number of compartments each differing incrementally from its adjoining compartments in permeability to the test fluid or its reaction products, the layer 12, can, in effect, provide a continuous gradation of concentration as will be described.

While the regions 20a–20d inclusive are illustrated as being in the form of thin rectangular wafers, it is to be understood that they may be in any configuration desired. For example, each region may be in the form of a thin cross wherein the peripheral compartments at the ends of the cross tips feed into one main compartment at the center of the cross. By varying the cross-sectional area of the channels between the region's compartments, the rate of migration or rate of flow from one compartment to another may be maintained at any level desired simply by changing the density, thickness, or shape of the barrier 22 between the several compartments. The shape and relationship of the region's compartments formed by the barriers 22 will determine the location or manner in which the information is displayed.

The barriers 22 preferably are formed by impregnating the cellulose substrate, which forms the membrane layer 12, with a polymer of a specific concentration utilizing a masking technique. The polymer is dissolved in a solvent and the solution applied to the mask onto the areas wherein the barriers are to be formed. The solvent migrates away from these areas where the solution encounters the substrate but the rate of migration is too slow to significantly blur the effect of the mask. The solvent is quickly evaporated and the polymer (cellulose acetate or other polymer of high water permeability is preferred) is left in the configuration, dictated by the mask and the barrier 22 formed. It may also be formed by impregnating the various strips 20a–20d as separate strips and then using the polymer as a glue to join the strips together.

The compartments or regions 20a through 20d, inclusive, are usually impregnated with a sceeninng chemical which is sensitive to the fluid under test so as to react with the component therein that is under test. In some cases layer 10 will be impregnated with a chemical that is reactive with a fluid component to produce in layer 10 a new product which is detected. In this use the screening chemical will be reactive with the new product.

A different concentration or quantity of the screening chemical is placed in each of the compartments or regions 20a through 20d, inclusive, in a sequential manner of increasing concentration. These reagents or compartments 20a through 20d, inclusive, thus serve as separate areas which encapsulate specific chemicals which can react with and thereby control the passage, i.e., the permeation of the chemical under test through the reagents.

Figure 5:
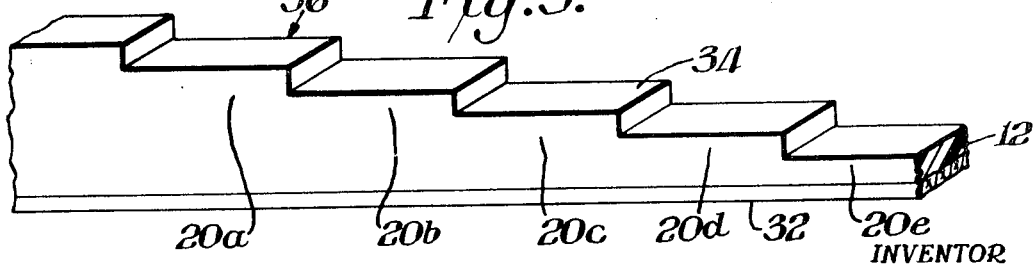
FIG. 5 is a partial pictorial representation of still another alternative embodiment of the permeable membrane that may be used in the embodiment illustrated in FIG. 2.
Figure 6:
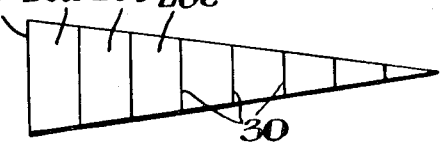
FIG. 6 is a plan view of still another alternative embodiment of this invention which facilitates the preparation of the several membrane regions.

It is possible in one embodiment of the invention for this compartment configuration to maintain a very fine, incremental concentration gradient from one region to the next. This is achieved by constructing the regions of different volumes, as seen in FIG. 5, yet impregnating them with the same volume and concentration of solution. The chemical impregnated within them will then have its concentration adjusted to the volume of the compartment which encapsulates it. For instance, two compartments, one twice the volume of the other, but both impregnated with the same volume and concentration of chemical, will then have a concentration variance such that the compartment of the smaller volume will have twice the concentration of the compartment of higher volume. As shown in FIG. 6, the layer 12 can have a triangular shape with the barriers 30 dividing the strip into regions 20a, 20b, 20c, etc. of decreasing volume.

The chemical is placed in each region by first dissolving the chemical in a solvent to form a solution of a desired concentration. A specific volume of this solution is allowed to come in contact with the region. The region then draws the solution into its volume by capillary action. When the solvent evaporates out of the compartment, it leaves a specific concentration of the screening chemical in the compartment.

After the compartments are impregnated and dry, the entire membrane can be soaked with a liquid such as water, which causes slight transmigration to occur across the polymer barriers, between compartments, thus slightly evening out the difference between compartments. The result after this soaking is more even concentration gradients.

Referring now to FIG. 2, there is shown layer 14 which is made by depositing a relatively low (.500 to 3 percent by weight in a solvent such as acetone) concentration of an organic polymer such as cellulose acetate on top of layer 16. This has the advantage of producing a leveling or distributing effect which distributes the action occurring within each region and thereby increases the accuracy of the concentration gradient between regions. The transmission layer 14, which, as noted, is immediately adjacent the membrane layer 12, can be any porous organic polymer or thin celllulose composition. It provides by its capillary action a transmission medium between the membrane layer 12 and the display strip 16. The transmission layer 14 may also be formed of a porous laminated paper. While layer 14 is not essential, it is generally present for the advantages it affords.

The topmost layer, the display strip 16, is impregnated with an indicating substance which changes color when it receives the test substance either produced by the chemical reaction occurring in the reactant layer 10 or a material not combined with the screening chemical in the membrane layer 12.

The indicator layer 16, which can be backed against the permeable membrane 12, is a normal paper substrate which has been coated with a starch or resin in a standard manner. The coated paper is then soaked in the indicating chemical. The impregnated indicator paper is then dried. This coated indicator layer will change color when wetted with a chemical to which its indicator is sensitive, but because transverse migration in this layer would blur the effect of the compartment differences which feed into it, this coated indicator paper does not furnish any cross-migration. Backed directly against layer 12, transmission of a color eliciting chemical out of each region in layer 12 is registered separately on the indicator paper 16 because the coating blocks substantially all longitudinal migration affording a transmission connection between the membrane layer and the indicator layer.

EXAMPLE I

In the quantitative analysis of hemoglobin, for example, the hemoglobin is oxidized to methemoglobin by an oxidizing agent in the reactant layer 10. Potassium cyanide in the membrane layer 12 combines with methemoglobin to render it undetectable to a chemical indicator in the indicator display strip 16. The indicator layer display strip 16 responds to the absence and the position of the end product (or the original chemical under test) along the length of the test device. Thus by marking the display strip 16 with divider lines 40, the various gradations or dividing lines between the concentration areas may be noted.

Figure 3:
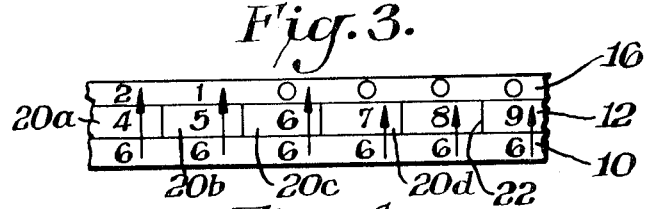
FIG. 3 is a diagrammatic representation of the passage of fluids through the permeable membrane to the display strip of the test device illustrated in FIGS. 1 and 2.

For purposes of illustration and with particular reference to FIG. 3, it will be assumed that material has left container 18 and passed into layer 10 where a reaction occurred and that the end or test product (potassium ferrocyanide) has a concentration represented by the magnitude of the numeral 6 appearing throughout the reactant layer 10 in this figure. The several regions 20a, 20b, 20c and 20d of the differential membrane 12 have differing concentrations of potassium cyanide which reacts with the end product. The differing concentration in each of these regions is represented by the magnitude of the relative numbers 4, 5, 6, 7, 8, and 9 which represent the concentration of the several different regions 20a through 20d of the membrane layer 12. The end product (potassium ferrocyanide) is seen to pass through the membrane layer 12 in those regions where its concentration is high enough to overcome combination with the chemical encapsulated within the membrane layer 12. This passage occurs at a specific concentration of chemical in the membrane and in this instance, is seen to occur between the regions 5 and 6 in FIG. 3. Thus, the end product does reach the display strip 16 in concentration regions 4 and 5, but not in concentration regions 6, 7, 8 and 9 of FIG. 3. In the concentration regions 4 and 5, the concentration of the screening chemical is such that it cannot block the passage of end product by combining with all of the end product. Thus, the end product reaches the display strip 16 in these regions.

The display strip 16 is impregnated with an indicating substance which changes color when it receives the end product not combined with the chemical in the membrane layer 12. The permeation through the concentration organic polymer which is deposited on the cellulose acetate substrate transmission layer, usually present but omitted in FIG. 3 for convenience, increases the accuracy and uniformity of the concentration gradient throughout each region. Since the transmission layer 14 possesses the ability of transverse permeability in the region of the barriers 22, transverse migrations occur between adjoining regions to aid in the formation of a continuous gradient along the length of the transmission layer 14 nd, hence, along the length of the display strip 16.

When the reaction is complete, the display strip 16 which is placed against the transmission layer 14 or layer 12 with the use of an adhesive, is merely peeled back and removed from the test device. This provides a permanent color record of the presence and concentration of the methemoglobin in the hemoglobin sample.

Figure 4:
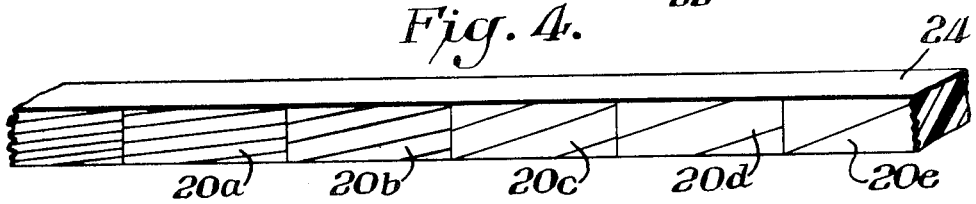
FIG. 4 is a partial pictorial representation of an alternative embodiment of the invention which utilizes a different membrane than that illustrated in FIG. 2.

Another embodiment of the invention is illustrated in FIG. 4. FIG. 4 shows in pictorial view only a layer 24 which may be substituted for the layers 12 and 14 of FIG. 2. The membrane in this instance is formed of a porous cellulose substrate with each region 20a–20d differentially soaked with a porous membrane forming polymer such as cellulose acetate or other suitable membrane forming polymer that is water permeable. In this manner, the permeability of each of the sections 20a through 20e varies in incremental manner so that varying quantities of the material under test or its end product is permitted to pass through the membrane to display layer 16 (FIG. 1). This embodiment is particularly useful for the determination of a concentration of a chemical which is the primary chemical present in solution (such as an acid dye in a water solution). This porous membrane so formed to make up the layer 24 is then exposed to the dye which is introduced through the capillary sized channel 18. The dye passes through the porous membranes to the indicator strip 16, not shown for convenience. Its concentration is measured by the time it take to pass through a given section of the incremental diffusion gradient created. Since each of the regions 20a through 20e inclusive is soaked with a different amount of the membrane forming polymer, the permeability of the several sections to the dye will vary. That section having the most permeability will permit the most dye to pass through in the shortest amount of time. The dye itself will provide the indication on the indicator strip and, hence, no particular chemical process need be employed. On the other hand, if an acid or alkaline dye is used, a conventional pH indicating paper may be employed for the indicating strip 16, affording the chemical reaction to produce the indicating color change.

In another alternative embodiment, the differential membrane thickness layer 36 illustrated in FIG. 5 may be substituted for the differential concentration layer 24 of FIG. 4 or layer 12 of FIGS. 1–3. The layer 36 may be formed by utilizing a porous cellulose substrate 32 and depositing thereon different thickness layers of a permeable polymer membrane 34 to form a step-like configuration wherein each of the regions 20a, 20b, 20c, etc. present different thicknesses of a membrane to the permeation or migration of the end product or original chemicals therethrough. Here again, the concentration of the test fluid is determined by the time required to pass through a given thickness section.

Regardless of the embodiment employed, all are designed to present different regions, each of which presents a different permeability to the migration of the chemical end product or the original chemical under test. Thus the passage of the chemical under test or its end product is impeded to a very great extent depending upon the extended region it passes through. The permeability which impedes the migration may be either chemical in nature or physical in nature as described.

EXAMPLE II

To illustrate further the use of a device of this invention, the following example is given in which hemoglobin concentration is determined. The device of this invention used in this example consisted of a receiving layer that obtained the test fluid from a capillary tube, a compartmentalized layer that contained a gradient concentration of a reagent and finally a layer which was uniformly impregnated with an indicator. The test fluid passed through the first two layers and then registered on the indicator layer.

As previously described, this inner layer was composed of a number of compartments separately impregnated and holding a series of successively higher concentrations. The reagent concentration of this layer is therefore a gradient concentration.

The reagent in the compartmentalized layer is ammonium sulfate (impregnated in the gradient concentration described) which forms an insoluble precipitate when reacted with alkali hematin. The indicator layer is impregnated with an indicator which is sensitive to the peroxidase activity of alkaline hematin. Such indicators in the presence of a peroxidase active biological compound are catalytically oxidized to their colored forms by hydrogen peroxide. Among indicators of this type which can be used in this invention are guaiac, benzidine, benzidine dihydrochloride, o-tolidine, and mixtures thereof. The embodiment of this invention performs quantitative hemoglobin analysis.

A sample of blood is diluted with a known volume of alkaline solution. The hemoglobin in the blood which has been entered into the alkaline solution is denatured to alkaline hematin. A known volume of this alkaline hematin solution is placed in capillary channel 18 and is allowed to permeate through all of the layers. As this solution permeates through the reagent layer, it combines with the ammonium sulfate to form an insoluble precipitate. In the combined form, the hematin cannot pass through to the indicator layer. Because the reagent layer is impregnated with a gradient concentration (in its series of compartments) at the points in this layer that all the hematin is not combined, an excess of hematin passes through the reagent layer to the indicator layer.

Uncombined hemoglobin is then present at the indicator layer if it has passed through the reagent layer. If hydrogen peroxide is present, either by its formation from compositions in the indicator layer, or by external application, a color appears. Because the color reaction only occurs at those points on the indicator which have been encountered by hematin, and because the passage of hematin depends on the concentration of reagent in the reagent layer, the indicator layer will display, in a "bar graph fashion" the concentration of hematin. That is, there will be bars or sections along the length of the indicator strip that are deeply colored, less and less colored and colorless depending on the passage of hematin.

One of the embodiments of this invention was fabricated in this manner using these chemical compositions:

(A) In a strip of polyethylene ¼ in. by 1/16 in. by 3 in. was cut a groove 3/64 in. deep and 3/64 in. wide along the center of its length. This groove became the capillary tube 18 to feed the receiving layer 10.

(B) This layer was a highly porous paper strip. Suitable papers are rayon porous paper or filter papers of highest porosity. This specific layer possessed the same dimensions as the polyethylene strip, except for its thickness, which was about 2 mils. It was laminated onto the grooved face of the polyethylene strip with rubber cement in two bands on opposite sides of the capillary groove. The lamination was carried out so that no glue was obstructing the flow out of the capillary groove into the porous paper.

(C) The reagent layer which is composed of a number of compartments separated by organic polymer separating membranes. This layer was constructed out of a filter paper substrate impregnated with the separating membrane bands and then impregnated with the reagent. Experiments have shown that other suitable substrates are: cellulose triacetate membrane filter material, rayon paper, and other types of permeable paper. A 3 in. by ¼ in. strip of porous paper was impregnated with cellulose acetate barrier membranes separating the strip into ten ¼ in. bands, sections or compartments. This was accomplished by the masking procedure previously described where the cellulose acetate solution was allowed to contact the paper only where an impregnation was desired.

The indicator solution was prepared next. This was because it was necessary to determine the indicator's sensitivity, adjusting it and determining the reagent concentrations which would work in this range of sensitivity. A peroxide sensitive indicator can be too sensitive for the quantitative analysis of blood hemoglobin, so ascorbic acid, an inhibitor in this reaction, was added to this indicator solution to lower its sensitivity. It was found that .01 gm./ml. ascorbic acid added to an o-tolidine indicator solution of 20% reduced its sensitivity to .004 gms./ml. of hemoglobin. In this sensitivity, a color was produced that persisted after one minute, apermanent color change actually being obtained at this hemoglobin concentration.

It was found that ammonium sulfate concentration .16 gms./ml. precipitated .01 gms./ml. alkaline hematin so that it was undetectable by the indicator.

In producing the compartmentalized reagent layer the following steps were taken:

The concentration of reagent which combines with a known amount of hematin was determined. The sensitivity of the indicator after the addition of the ascorbic acid inhibitor was determined. The number of grams of hematin passing through a compartment in this layer at a specific alkaline hematin dilution was calculated. Knowing over what range the quantitative analysis was desired, a gradient concentration of reagent was impregnated in the compartments of the layer (as in the test for hemoglobin over the range of 11–21 gms./100 ml., the reagent concentrations impregnated in this layer combined with this range of hemoglobin) and the reagent layer was laminated to the receiving layer and the indicator layer (prepared below) using a thinned starch paste, the three layers being sealed and dried with an iron.

In producing the indicator layer the following steps were taken:

The indicator layer was fabricated from a standard grade coated paper. The paper layer was soaked in the indicator and ascorbic acid solution. After being dried, a thin membrane was formed by applying cellulose acetate to the paper. Even though this cellulose acetate treatment is not necessary for the function of the invention, it seems to cause the layer to wet more evenly and quickly.

In forming the compartments various solutions of cellulose acetate in acetone were used as the impregnating solutions. The following shows the permeation allowed by the given concentration:

5.0%—no passage between compartments; 4.0%—very small passage; 3.5%—passage between compartments; 2.5% compartments virtually undifferentiated; 0.5%–1.5%—membrane suitable for indicator layer.

The following tabulation gives the reagent concentration and the ingredients in the indicator solution.

| Compartment | Grams ammonium sulfate |
|---|---|
| 1 | .00264 |
| 2 | .00288 |
| 3 | .00312 |
| 4 | .00336 |
| 5 | .00360 |
| 6 | .00384 |
| 7 | .00408 |
| 8 | .00432 |
| 9 | .00456 |
| 10 | .00480 |

Range—11–21 gms. Al hematin/100 ml.
Dilution .0025/1.

Indicator solution

20% o-tolidine in ethyl alcohol
.06 gms./100 ml. indicator ascorbic acid
.5% cellulose acetate membrane on impregnated, dried indicator layer
hydrogen peroxide 10–20%

The compartmented reagent layer can contain a reagent which inhibits the indicator-hemoglobin reaction, instead of precipitating the hemoglobin. Such a reagent could be ascorbic acid, hydriodic acid, acid citrate dextrose, balanced oxalate, or ethylenediaminetetraacetic acid. The hemoglobin permeating from layer one is added to a selection of inhibitor concentrations in the compartmental layer, before it passes to the indicator layer. At compartments in the layer where the concentration of hemoglobin is more than the inhibitor can mask, a color reaction is ellicited at the indicator layer. Similar indicator compositions will work for this embodiment as for the last example.

This embodiment wass fabricated identically as described above, except for the reagent in the compartmental layer. The reagent used in this embodiment was ascorbic acid. Ascorbic acid crystals were dissolved in water and impregnated in this gradient concentration:

| Compartment: | Grams ascorbic acid |
|---|---|
| 1 | .00062 |
| 2 | .00124 |
| 3 | .00186 |
| 4 | .00248 |
| 5 | .00310 |
| 6 | .00372 |
| 7 | .00434 |
| 8 | .00496 |
| 9 | .00558 |
| 10 | .00620 |

Range—0–10 gms. hemoglobin/100 ml. in water diluted .0025/1.

Indicator—10% benzidine-dihydrochloride in water.

If desired, a buffer could be added to layer one or three to maintain a specific pH.

In this instance a decisive, easily readable bar graph was also quickly obtained.

What is claimed is:

1. A method of testing for the concentration of a substance using a permeable member having at least two regions differing in permeability which method comprises:
permitting the substance to permeate through said member, subjecting the substance passing through each of said regions to an indicator that provides a visual indication of the presence of said substance and, determining the region through which the substance permeates first to thereby provide an indication of the concentration of the substance.

2. A method according to claim 1 wherein said substance is hemoglobin.

3. A method according to claim 1 which includes the step of subjecting said substance to a reagent in said member to react with it to produce a product that is capable of permeation through said regions to an extent depending upon the permeability of the regions, said indicator being responsive to said product.

4. A method according to claim 3 which includes the step of reacting said product prior to permeation through said regions with different concentrations of a chemical in said member to prevent the passage of said product through regions having a higher concentration of said chemical than said product.

5. A layered testing device for determining concentration of a material in a liquid, said layers comprising:
a permeable member having first and second regions of different permeabilities;
contact means adjacent said member to apply said material to each of said member's regions;
indicator means contiguous to each of said member's regions and impregnated with a substance for producing a reaction with said material to produce a product and in which the product permeates through the regions of said permeable member only if the concentration of the material exceeds a predetermined level, the differing permeabilities of the regions indicating concentration by the presence or absence of product permeating therethrough.

6. A device according to claim 5 which includes a semipermeable membrane between said regions.

7. A device according to claim 5 which also includes a porous member disposed between said permeable member and said indicator means.

8. A device according to claim 5 wherein said contact means is a porous element impregnated with a reagent system to react with a component in said material to produce an end product capable of permeation through said device, and said indicator means is responsive to said end product.

9. A device according to claim 8 wherein said regions are each impregnated with different quantities of a screening chemical sensitive to said end product.

10. A device according to claim 8 wherein each of said regions has a different layer thickness, thereby to provide said different permeability to said end product.

11. A device according to claim 8 which includes a semi-permeable membrane between said regions.

12. A device according to claim 11 which also includes a porous member disposed between said permeable member and said indicator means.

13. A device according to claim 8 which also includes a porous member disposed between said permeable member and said indicator means.

14. A device according to claim 13 which also includes a semi-permeable membrane between said regions.

References Cited

UNITED STATES PATENTS

| | | | |
|---|---|---|---|
| 3,510,263 | 5/1970 | Hach | 23—253 TP |
| 3,531,254 | 9/1970 | Okuda | 23—253 TP X |
| 3,607,093 | 9/1971 | Stone | 23—230 B X |

JOSEPH SCOVRONEK, Primary Examiner

R. M. REESE, Assistant Examiner

U.S. Cl. X.R.

23—230 B, 253 TP